United States Patent Office 3,497,101
Patented Feb. 24, 1970

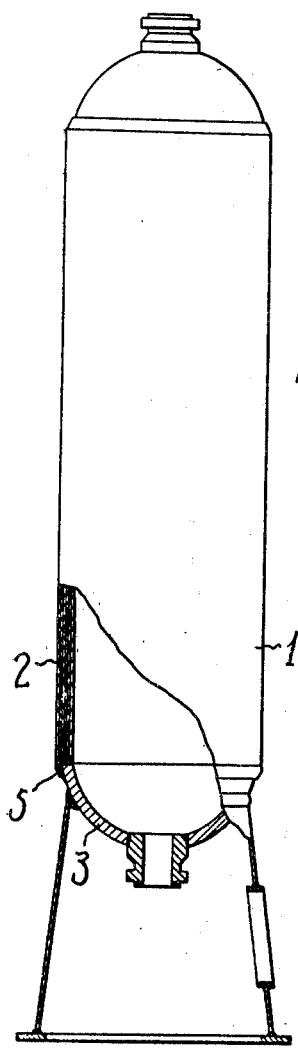
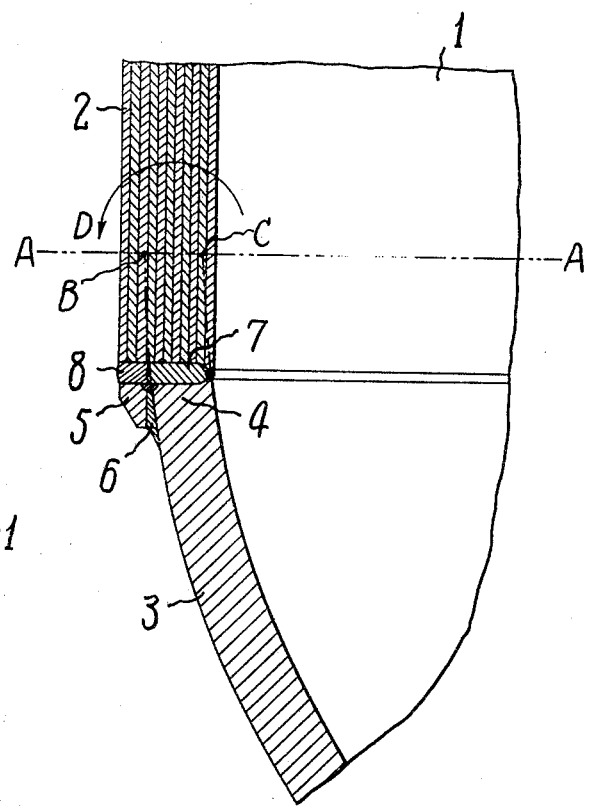

3,497,101
MULTI-LAYER CONTAINER
Hideo Sagara, 530–8 Kogokitamichi, and Kaoru Ono, 5–1 Kogominamimachi, both of Hiroshima, Japan
Filed Jan. 25, 1968, Ser. No. 700,429
Claims priority, application Japan, Jan. 31, 1967, 42/6,206
Int. Cl. F17c 13/00
U.S. Cl. 220—3
8 Claims

ABSTRACT OF THE DISCLOSURE

The invention described in this application relates to a container comprising a multi-layer cylinder and an end plate of a smaller thickness than that of the multi-layer cylinder. They are welded by means of a circular welding joint and a layer of ductile steel with a yield point lower than that of said end plate. The weld includes deposition between the external circumference of the end plate and the end of the cylinder, thereby making the thickness of the end portion of said end plate substantially that of said multi-layer cylinder.

BRIEF SUMMARY OF THE INVENTION

This invention relates to a multi-layer container.

For use as a large-size container for high pressure purposes, a cylinder consisting of many layers of thin steel or band steel is easier to manufacture than a single-layer cylinder. Indeed the former cylinder is rather tough and safe in practical use so that it has been used extensively as an ammonia synthesis tower or large-size container for high pressure purposes. However, in welding a dish-shape or semi-spherical-surface plate to the end portion of such cylinder when the former is of a thickness smaller than the latter, it is required by the law or regulations that the end portion of the cylinder be reduced in thickness at less than the gradient of ¼ until it reaches the same thickness as the end plate thereby making the manufacturing procedure of the end portion of the cylinder rather complicated and moreover, exhibiting the drawback of lowering the strength of the cylinder.

An object of the present invention is to provide a multi-layer container free of the above-mentioned drawback.

Another object of the present invention is to provide a multi-layer container wherein an end plate of a smaller thickness is employed than that of the multi-layer cylinder of the container and then the end plate is welded to the multi-layer cylinder by providing a layer of ductile steel with a yield point lower than the end plate on the external circumference of end portion of the end plate so as to make the thickness of said end plate substantially to that of the multi-layer cylinder, and then the end plate thus formed is welded to the multi-layer cylinder.

Still another object of the invention is to provide a multi-layer container wherein an end plate of a smaller thickness is employed than that of the multi-layer cylinder of the container, and the center of curved surface of the end portion of the end plate is so designed as to remain inside the multi-layer cylinder, a layer of ductile steel with a yield point lower than that of the end plate is provided on the external circumference of the end portion thereof so as to make its thickness approximate to that of the multi-layer cylinder and then said multi-layer cylinder and end plate are welded together by means of a circular welded joint.

Other objects and characteristics of the invention will become apparent from the following description.

According to the present invention, it is unnecessary to work up the end of the multi-layer cylinder at a small gradient so that the manufacturing operation is rendered easy and moreover, it is made possible to ensure the strength of the end portion of the cylinder at a high degree. In addition, due to the provision of a layer of ductile steel with a yield point lower than the end plate on the external circumference of the end portion of the latter, there is no risk of concentration of any excessive stress on said end portion, thereby ensuring its extreme safety in use.

In providing said layer of ductile steel on the external circumference of the end plate, it is possible to make a welding deposit of soft steel with a yield point lower than that of the end plate or to place a steel material around the external circumference of said end portion and to weld the steel material by joint welding. At the same time, said deposited steel may not always be soft by nature if the yield point and yield ratio of said steel material are made lower than those of the body of the end plate and also the welded portion may be made ductile by some heat treatment.

In another embodiment of multi-layer container of the present invention, the center of curvature of the end portion of the end plate is situated inside the multi-layer cylinder so that the surface area of the end plate is minimized and the amount of material for such use can be saved and its processing procedure is made easy. Consequently, it is possible to save on the manufacturing cost of the end plate on the one hand and a little extension of the multi-layer cylinder does not increase its manufacturing cost to any appreciable degree on the other hand, which will be thus effective in reducing the manufacturing cost of the multi-layer container, while including the effect of provision of said ductile steel layer with a low yield point on the external circumference of said end plate, providing a good-quality multi-layer container.

BRIEF DESCRIPTION OF THE DRAWINGS

FIG. 1 is an elevational view of a large-size multi-layer container with a part thereof omitted in vertical cross section. FIG. 2 is an enlarged view of the fixed portion of the multi-layer cylinder and end plate of FIG. 1.

DETAILED DESCRIPTION

The characteristics, action and effect of the present invention will be explained in detail with reference to the embodiment as shown in the accompanying drawings.

There are indicated the multi-layer container at numeral 1, the multi-layer cylinder at 2 and the end plate at 3. In this case, the internal diameter of the multi-layer cylinder 2 is defined as 4000 mm., its thickness as 180 mm. and the end plate 3 is made of a single-layer steel plate with the internal radius of its spherical surface as 2020 mm. and its thickness as 120 mm. The external circumference of the end portion of the end plate 3 is ringed by a soft steel material 5 and the ringed portion thus formed is welded by means of a deposited steel member 6. In this way, the thickness of the end portion reaches 180 mm., equivalent to that of the multi-layer cylinder 2. The face of the end portion 4 of the end plate 3 thus made up of 3 layers sits against an end of the multi-layer cylinder 2 and both these are welded by means of a circular welded joint with two layers of deposited steel 7 and 8. The above mentioned multi-layer cylinder 2, end plate 3 and deposited steel member 7 are made of high-tension steel having a mechanical property of the same degree. By the way, said soft steel material 5 and deposited steel members 6 and 8 are made of soft steel with a yield point lower than those already mentioned above and with enriched ductility.

For example, said soft steel material 5 and deposited steel members 6 and 8 have tensile strength of about 35–45 kg./mm.$^2$. And said cylinder 2, end plate 3 and deposited steel member 7 have tensile strength more than about 60 kg./mm.².

In the embodiment shown in the drawing, the center of the spherical surface of the end plate 3 is adapted to fall on the line A—A inside the multi-layer cylinder 2 and the projections of the internal and external surfaces of the end plate are found to intersect the points B and C respectively on the same line and within the thickness of the multi-layer cylinder. Line A—A is on a diametral chord of the end plate.

In this case, the end plate 3 may be understood such that it is extended by means of deposited steel member 7 and part of cylinder 2 as a joint up to a projected position B and C on its diametrical chord and its internal and external circumferences are fortified by the cylinder 2 and the layers of soft steel material 5 and deposited steel members 6 and 8. This soft steel material 5, and deposited steel members 6 and 8, are softer than the end plate 3 and are sufficiently ductile so that no risk of concentration of stress may occur on the end plate 3.

In the case of taxing internal pressure on a container composed of a thick cylinder and a semi-spherical end plate joined by means of a circular welded joint, the expansion of diameter of the cylinder is larger than the end plate and the moment shown by the arrow D at the joint surface of A—A may act on the side of the end plate, but nevertheless, since the cylinder is made up of many layers, there occurs partial sliding inside the layers until the amount of said moment is reduced and thus the stress between the multi-layer cylinder 2 and the end plate 3 will be found smaller than in the case of a single-layer cylinder.

In the embodiment shown in the drawing, the soft steel material 5 is welded, by means of the deposited steel member 6, to the external circumference of the end portion 4 of the end plate 3 but the soft steel material 5 may be replaced by other steel materials of the same property as of the end plate 3. Moreover, the portions corresponding to the soft steel material 5 and deposited steel member 6 may be formed by a deposited steel member alone. Again in the case of welding the cylinder 2 and the end plate 3 with the deposited steel member 7, the portions indicated at 5, 6 and 8 may be deposited by welding at one time. In either case as mentioned till now, it is possible to attain such action and effect as are considered to be the objects of the present invention.

By the way, as shown in the attached drawings, the center of spherical surface of the end plate 3 is adapted to remain inside the cylinder 2 thereby reducing the surface area of the end plate 3, saving its material so much, making its processing opeartion easy and thus reducing the manufacturing cost of the end plate considerably.

Also by adapting the spherical center of the end plate 3 to remain inside the cylinder 2, a little extension of the cylinder 2 in length may not add to the manufacturing cost and hence this kind of end plate is effective in reducing the manufacturing cost of all the assembly of the multi-layer container itself. In particular when the cylinder 2 is constituted in tandem form with band steel coils, the manufacturing procedure of the container is very effective only by adjusting the cut-away amount of band steel of either end up to the completion of the entire length of the cylinder, due to the fact that the width of band steel coils is already predetermined and so is the length of each unit of cylinder.

What is claimed is:

1. A container comprising a multi-layer cylinder (2), and an end plate of a smaller thickness than that of the multi-layer cylinder, an end portion (4) of the end plate secured to an end of the multi-layer cylinder by a first weld (5, 6, 8) including ductile steel with a yield point lower than that of said end plate and by a second weld (7), the first weld (5, 6, 8) joining the external circumference of the end portion (4) and the end of the multi-layer cylinder, the second weld (7) joining the face of the end portion (4) to said end of the multi-layered cylinder (2), the first weld (5, 6, 8) making the thickness of the end portion of said end plate substantially that of said multi-layer cylinder, the end plate having a spherical shape, the spherical center of said end plate lying inside said multi-layer cylinder.

2. A container as claimed in claim 1, the first weld (5, 6, 8) comprising material (5) ringing the external circumference of the end portion (4), and deposited members (6) and (8) having a lower yield point than that of the end plate, the deposited member (6) welding the material (5) to said end of the multi-layer cylinder, the deposited member (8) welding the material (5) to the external circumference of the end portion (4).

3. A container as claimed in claim 2, the material (5) having a yield point lower than that of the end plate.

4. A container as claimed in claim 3, the second weld (7) having a yield point substantially equal to that of the end plate, the multi-layered cylinder having a yield point substantially equal to that of the end plate.

5. A container as claimed in claim 1, the end plate having projected points (B and C) situated on a diametral chord and situated within the thickness of the multi-layer cylinder.

6. A container as claimed in claim 2, the end plate having projected points (B and C) situated on a diametral chord and situated within the thickness of the multi-layer cylinder.

7. A container as claimed in claim 3, the end plate having projected points (B and C) situated on a diametral chord and situated within the thickness of the multi-layer cylinder.

8. A container as claimed in claim 4, the end plate having projected points (B and C) situated on a diametral chord and situated within the thickness of the multi-layer cylinder.

References Cited

UNITED STATES PATENTS

| 2,217,070 | 10/1940 | Zerbe | 220—3 XR |
| 2,792,965 | 5/1957 | Schoessow | 220—69 |
| 2,962,182 | 11/1960 | Rossheim | 220—69 |
| 3,268,103 | 8/1966 | Nelson | 220—3 |
| 3,365,786 | 1/1968 | Takemura | 220—3 XR |

RAPHAEL H. SCHWARTZ, Primary Examiner

U.S. Cl. X.R.

29—471.1; 220—67, 69